Aug. 7, 1923.
W. S. DOE
1,464,413
RENEWABLE PRIMARY DRY CELL BATTERY
Filed May 2, 1921
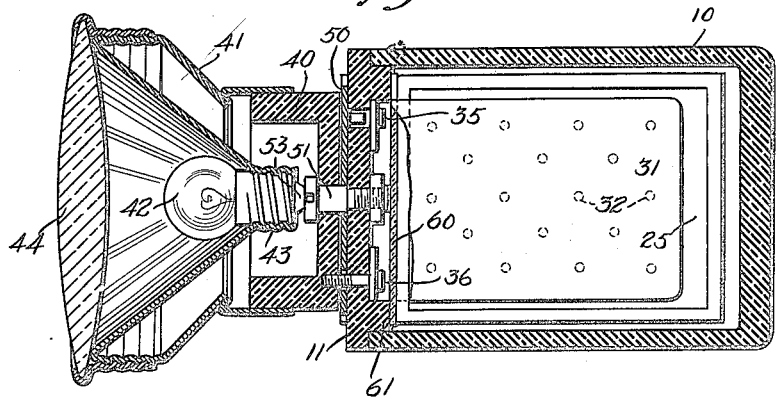
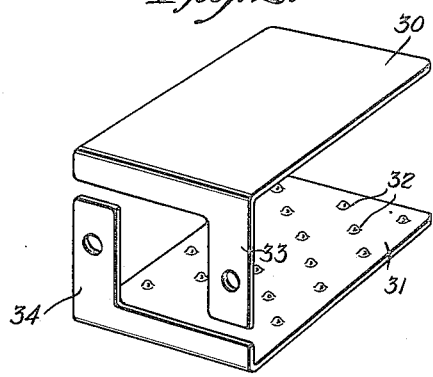
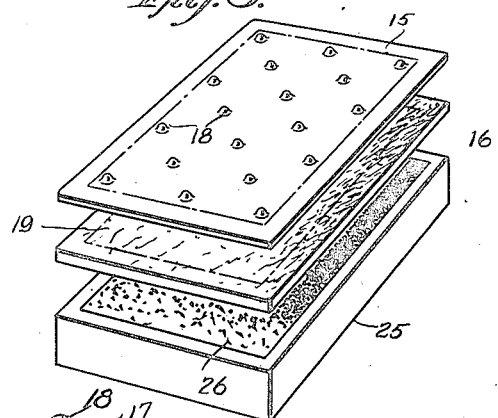
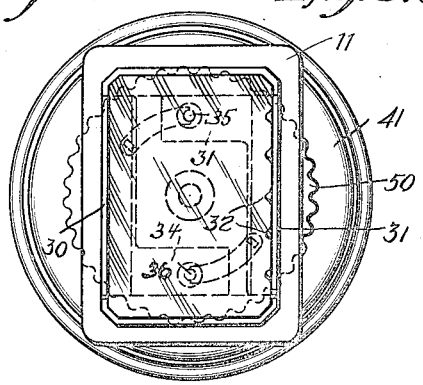
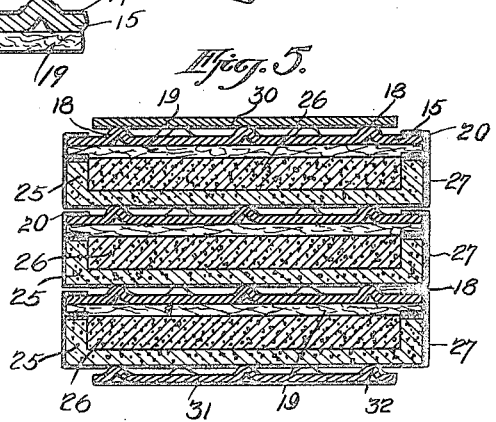
WITNESSES  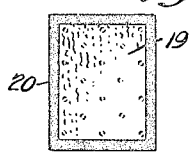
INVENTOR
WALTER S. DOE.
BY
ATTORNEYS Patented Aug. 7, 1923.

1,464,413

UNITED STATES PATENT OFFICE.

WALTER SCOTT DOE, OF KENT, OHIO.

RENEWABLE PRIMARY DRY-CELL BATTERY.

Application filed May 2, 1921. Serial No. 466,035.

*To all whom it may concern:*

Be it known that I, WALTER SCOTT DOE, a citizen of the United States, and a resident of Kent, in the county of Portage and State of Ohio, have invented a new and Improved Renewable Primary Dry-Cell Battery, of which the following is a full, clear, and exact description.

The object of the invention is to provide a new and improved renewable primary dry cell battery arranged to enable the user to readily disassemble the parts, renew the combined depolarizer and excitant or the zinc element, and reassemble the parts to again have an effective battery the same as originally produced and placed on the market by the manufacturer.

Another object is to provide a primary dry cell battery exceedingly serviceable for use in self-contained electric lamps, flashlights, hearing instruments for the deaf and the like.

Another object is to market the battery in conjunction with a jar or other container filled with a combined depolarizer and excitant, to permit the user to renew the combined depolarizer in the battery whenever the latter shows signs of becoming exhausted.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a sectional side elevation of the improved renewable primary dry cell battery arranged as the source of electricity for a flashlight;

Figure 2 is a perspective view of the poles of the battery;

Figure 3 is a similar view of the several parts of a single cell in disassembled position;

Figure 4 is an end view of the flashlight with the casing removed;

Figure 5 is a cross section of the battery formed of three superimposed cells;

Figures 6 and 7 are reduced face views of the positive element; and

Figure 8 is an enlarged sectional side elevation of a portion of the positive element.

The dry cell battery illustrated in the drawings is formed of three cells but it is expressly understood that I do not limit myself to this number of cells as a single cell, two cells, or more than three cells may be used according to the use made of the dry cell battery and the voltage required for a particular purpose. The dry cell battery is mounted in a suitably constructed casing 10 made of hard rubber or other insulating material and closed by a removable cover 11. Each of the cells comprises a positive element and a negative element, of which the positive element is preferably in the form of a zinc plate 15 having a bare under face (see Figure 7) and an upper face provided with a coating 17 of varnish or other insulating material, and from this face also project struck-up protuberances 18, the points of which are bare, as indicated in Figure 6. The bare under face of the zinc plate 15 is provided with a lining 19 of bibulous or absorbent material preferably blotting paper chemically treated with an excitant salt such, for instance, as a solution of sal ammoniac— 2 lbs., and bisulphate of mercury—1 oz., dissolved in a gallon of water. The lining 19 after being dried is fastened by a cementitious material 20 at its margin to the margin of the bare face of the zinc plate 15. Thus the zinc plate and its lining form a single unitary structure.

The negative element comprises a shallow pan 25 made of carbon, graphite or a similar conducting material, and this pan 25 contains a filling 26 which combines a depolarizer and excitant and preferably consists of powdered carbon—1 lb., powdered graphite—$\frac{1}{4}$ lb., manganese dioxide—1 lb., and peroxide of lead—$\frac{1}{4}$ lb., mixed and bound together with an excipient binding compound of glycerite, preferably framed by mixing glycerine with tragacanth. The top, sides and ends of the pan 25 are provided with a coating 27 of an insulating material, and the filling 26 is flush with the top of this coating 27 and is in contact with the lining 19. In assembling two or more cells the protuberances 18 of one cell are in contact with the under side of the pan 25 of the next following cell, as will be readily understood by reference to Figure 5. It will be noticed that the coatings 20 and 27 prevent local electric currents from passing from the positive element to the negative element by lateral by-ways.

In practice, a jar or other container filled with the combined depolarizer and excitant 26 is furnished with a battery to enable the user to periodically renew the battery, in case the same is run down, by removing the filling 26 from the pan 25 and replacing it by a new material from the jar. Thus the user of the battery can practically prolong the life of the battery almost indefinitely, it being only necessary to periodically renew the filling 26 and, if needful, the zinc plate 15.

In order to put the parts of a cell into action, the positive element formed of the zinc plate 15 and lining 19 is dipped into water and then placed in position on the negative element with the moist lining 19 in contact with the filling 26, which is in powder form and thus readily partakes of the moisture in the lining 19 to render the depolarizer and excitant active. It will be noticed that any number of cells such as described can be superposed to increase the voltage of the battery without the use of special wiring or soldering of connections.

The cells in superposed position as shown in Figure 5 are held between contact plates 30 and 31 of spring metal, of which the contact plate 30 bears against the protuberances 18 of the outermost zinc plate 15, and the other contact plate 31 is provided with struck-up protuberances 32 bearing against the under side of the outermost pan 25. The contact plates 30 and 31 are provided at their upper ends with angular flanges 33 and 34 fastened by binding posts 35 and 36 to the under side of the cover 11. The binding post 36 connects with the base 40 of a housing 41 of an electric lamp 42 held in a reflector socket 43 forming part of the housing 41. The usual lens 44 is mounted in the outer end of the housing 41. The electric lamp 42 is electrically connected with the binding posts 35 and 36 by a switch 50 preferably in the form of a disk mounted to turn on a central screw 51 connecting the base 40 with the cover 11. The screw 51 is engaged by one of the contacts 53 of the electric lamp 42 and hence when the switch 50 is in one position the electric current is cut off and in another position the electric current from the battery supplies the lamp 42 with electrical energy. The electric lamp and its mounting does not form part of the present invention and hence further detail description of the same is not deemed necessary. A protecting plate 60 of mica or other material is interposed between the top of the several cells and a depending flange 61 on the under side of the cover 11 to prevent short circuiting.

It is understood that the casing 10 is of a size to snugly receive the superposed cells and the contact plates 30 and 31 to prevent the individual parts of the cells from becoming disassembled or shifted out of place.

The dry cell battery shown and described differs from the one disclosed in my application, Serial No. 421,236, filed on November 2, 1920, by providing a negative element in the form of a shallow pan of carbon or graphite filled with the combined depolarizer and excitant and providing a positive element formed of a zinc plate insulated on one face by a coating and having a lining of bibulous material permanently attached to the other bare face of the zinc plate.

Having thus described my invention, I claim as new and desire to secure by Letters Patent:

1. In a renewable primary dry cell battery, a zinc plate bare at one face and provided at the other face with an insulating coating and with protuberances bare at the points, a pan containing a renewable filling combining a depolarizer and excitant, and a lining of a moisture absorbing material on the bare face of the said zinc plate and in contact with the said pan and its filling.

2. In a renewable primary dry cell battery, a zinc plate bare at one face and provided at the other face with an insulating coating and with protuberances bare at the points, a pan containing a renewable filling combining a depolarizer and excitant, and a lining of a moisture absorbing material on the bare face of the said zinc plate and cemented along its margin to the margin of the zinc plate, the said lining being in contact with the said pan and its filling.

3. In a renewable primary dry cell battery, a zinc plate bare on one face and provided at the other face with an insulating coating and with protuberances bare at the points, a pan of a conducting material and having its sides, ends and top covered with an insulating material, a renewable filling in the said pan and combining a depolarizer and excitant, and a lining of a moisture absorbing material attached to the bare face of the said zinc plate and overlying the top of the pan and the filling contained therein.

4. In a renewable primary dry cell battery, a positive element, comprising a zinc plate provided on one face with protuberances, and a coating of an insulating substance covering the said face of the zinc plate and protuberances except the points thereof, a lining of bibulous material overlying the other bare face of the said plate, and means fastening the lining to the zinc plate.

WALTER SCOTT DOE.